United States Patent [19]
Copenhefer

[11] 3,830,045
[45] Aug. 20, 1974

[54] COMPACT AIR FILTER
[75] Inventor: John E. Copenhefer, Louisville, Ky.
[73] Assignee: United States Gypsum Company, Chicago, Ill.
[22] Filed: Oct. 30, 1972
[21] Appl. No.: 302,151

[52] U.S. Cl................. 55/501, 55/511, 55/524, 55/528
[51] Int. Cl.............................. B01d 39/14
[58] Field of Search...... 55/495, 518, 524, DIG. 31, 55/527, 528, 490, 501, 511, 514, 515, 509, 516, 519; 229/32

[56] References Cited
UNITED STATES PATENTS

| | | | |
|---|---|---|---|
| 2,965,197 | 12/1969 | Dow et al. | 55/DIG. 31 |
| 3,003,581 | 10/1901 | Greason | 55/524 |
| 3,023,839 | 3/1962 | Best | 55/DIG. 31 |
| 3,137,589 | 6/1964 | Mannheim et al. | 55/524 |
| 3,154,393 | 10/1964 | Klein et al. | 55/528 |
| 3,594,993 | 7/1971 | Heyse et al. | 55/527 |

*Primary Examiner*—Frank W. Lutter
*Assistant Examiner*—David L. Lacey
*Attorney, Agent, or Firm*—Stanton T. Hadley, Esq.; Esq. Kurlandsky; Kenneth E. Roberts, Esq.

[57] ABSTRACT

A compact fibrous glass air filter unit is provided having a rectangular frame holding an air filter; the frame having an edge flange portion having a top and a bottom half folded over the filter, said flange flaring outwardly from the filter; tab portions on the top or bottom flange portions to form tongue-and-groove interlocking at the intersection of the flange portions; a scrim covering above the filter; and a bottom covering of closely perforated sheet; the scrim, filter and perforated sheet all being adhesively or mechanically adhered between the top half and bottom half portions of the flange.

4 Claims, 4 Drawing Figures

PATENTED AUG 20 1974 3,830,045

COMPACT AIR FILTER

BACKGROUND OF THE INVENTION

This invention concerns an improved self-supporting, disposable fibrous glass air filter, and more particularly to a strong resilient unit of such air filter having a compact shape and structure.

Fibrous glass air filtering units have met outstanding commercial success in the market place over the years. Such filters are composed of glass fibers coated with a sticky substance for holding particles impinging against the fiber. Because of their high efficiency, reasonable cost, and inertness to corrosive agents such filters rapidly established a leading position in domestic forced air heating and air conditioning installations. However, a portion of this commercial success must be attributed to the attractive, simple and economical form in which these units have been produced, as well as excellent sales promotion of the product.

The design of the air filtering unit has remained virtually unchanged since its early introduction. The structure involves the filter itself, being a core of glass fibers bound together by small particles of a resinous binder and coated with a thin transparent film of a viscous non-volatile oil to retain air borne particles impelled against the fibers by the air movement, and the filter is confined between two closely perforated sheets of bright "brass colored metal," commonly known as bottle cap scrap. The filter and the pair of perforated confining brass sheets are held together within an inwardly facing U channel of a hollow frame of sturdy but inexpensive fiberboard, often decorated and reinforced by an overlay of imprinted paper tape. The side pieces of fiberboard are glued or stapled together at their ends to form the corners of the frame.

The bottle cap scrap is a unique adjunct of these air filters and appears to in part account for a portion of the commercial success and sales appeal of the product. The scrap is perforated stock obtained from bottle cap plants where the stock is punched with circular orifices placed as closely together as possible and thereby account for nearly 90 percent of the total sheet area. With the advent of newer caps for the bottling industry, bottle cap scrap is becoming scarce and is at a premium. Conversely, it provides a neat, uniform appearance to an air filter unit which has caught the consumers' appeal due to its appearance and gives solidarity to the filter unit. On the one hand, the bottle cap scrap is becoming scarce for use in air filters which usage requires two pieces of such scrap per filter unit; and on the other hand, an acceptable substitute for the consumer has not yet been found.

Further these air filter units have been characterized over the years in being virtually unchanged in their shape and structure. The air filter units are generally in a rectangular form, commonly available in thickness from one-half to two inches, and with varying dimensions to provide filtering areas between one-half and four square feet. Because of the inwardly facing U channel frame of the filtering unit, they are not compact or stackable; and thus are bulky when packaged in boxes. Though the packaged units are lightweight, a package of a half dozen is bulky and difficult to handle plus expensive to ship, where shipping costs are based on volume.

Recently, more compact units have appeared as shown in U.S. Pat. Nos. 2,965,197; 3,467,257 and 3,023,839. However, such units have not been entirely satisfactory because of inherently weakened structures or the provision of extra strength reinforcements that have necessitated the elimination of the bottle cap scrap facing entirely. The need for complex or exotic structural reinforcement arrangements has mitigated against acceptance of these filter units by both the air filter unit manufacturer and the consuming public. In addition, as to the consumer, these units just do not have the appeal of the air filter unit with which the consumer is familiar.

SUMMARY OF THE INVENTION

It is therefore one object and advantage of the present invention to provide fibrous glass air filter units which are compact and stackable to fit in a package having a volume of less than one-third of the regular volume for shipment and storage, whereby the costs of transportation and ease of handling are materially lessened.

Another object is the provision of compact fibrous glass air filter units that are stackable and which have sufficient integral strength that exotic and complex reinforcing means need not be used.

A further object is the provision of compact stackable air filter units having sufficient integral structural strength and integrity through the use of the commonly acceptable bottle cap scrap as to not need more complex or exotic structural reinforcing means.

A still further object is the provision of compact stackable air filter units which utilize per unit only one-half the bottle cap scrap required for conventional filter units, yet which provide a strong integral structure having pleasing appearance acceptable to the consumer.

The fulfillment of these and other objects and advantages of the present invention are accomplished by forming an air filtering unit having a rectangular frame holding the fibrous glass air filter; the frame having an edge flange portion having a top half and a bottom half folded over the filter, said flange flaring outwardly from the filter; tab portions to form tongue-and-groove interlocking at the intersections of the flange portions; a top covering scrim for the filter and a bottom covering of closely perforated bottle cap scrap brass sheet; the scrim, filter and perforated brass sheet all being adhesively adhered between the top and bottom portion of the flange. The bottle cap scrap or equivalent material provides necessary rigidity for shipping and handling and further so that air cannot blow the filter out of the filter frame during usage. The interlocking tabs in combination with the flange portion, the scrim and the bottle cap scrap all adhesively or mechanically secured provide a highly integral structural rigidity and strength. With this filtering unit, six filters will fit into a two inch thick package instead of the generally required six inch thick package for conventional filters. Thus the air filter is stackable to less than about 35 percent of its regular volume for shipment and storage, whereby costs of transportation and merchandising and ease of handling are materially lessened.

DESCRIPTION OF THE PREFERRED EMBODIMENT

Figure 1:
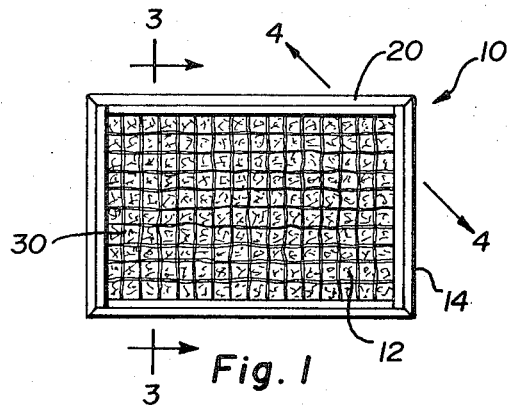
FIG. 1 is a plan view of an air filter unit of the invention.
Figure 2:
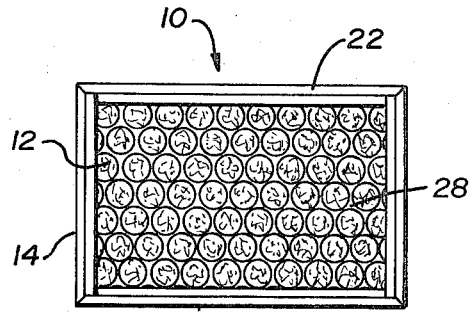
FIG. 2 is a like view of the opposite, or air outlet, side of the filter unit of FIG. 1.
Figure 3:
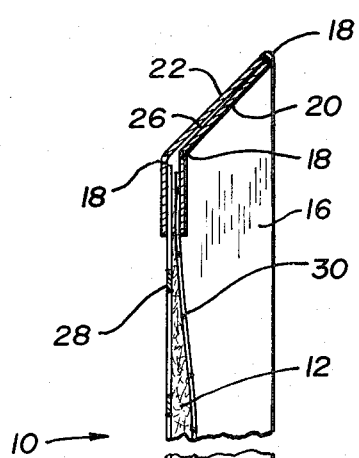
FIG. 3 is a cross-section of the air filter unit of FIG. 1 taken on line 3—3 thereof.

The air filter 10 of FIG. 1 is shown with its air inlet side facing the viewer and in FIG. 2 is shown with its air outlet side facing the viewer. The air filter 10 is confined on all of its four sides within the frame 14. The frame 14 has a cross-section, as shown in FIG. 3, of L shape with the base of the L being co-planar and semi-continuous with the filter 12 and with the more upright arm of the L constituting the generally rectangular outer rim 16 of the frame, which rim flares outwardly preferably at an angle of 106° to the plane of the filter 12. The L shape of the frame 14 is formed of fiberboard, preferably of common paper board composition, but may of course be of similar materials such as jute board, thin pressed board and the like including coverings of plastic sheet and stiffer fabrics, in which are placed perforations 18 to form score lines along which the fibreboard is bent to form a top frame edge flange 20 and bottom frame edge flange 22, as more particularly shown in FIGS. 3 and 4. Because the frame 14 is formed of a double thickness comprising a top frame edge flange 20 and a bottom frame edge flange 22 folded over each other at a score line and forming the outer rim 16, and because the edges of the flanges 20 and 22 are affixed to the filter 12, considerable strength and resiliency are imparted to the air filter unit.

Figure 4:
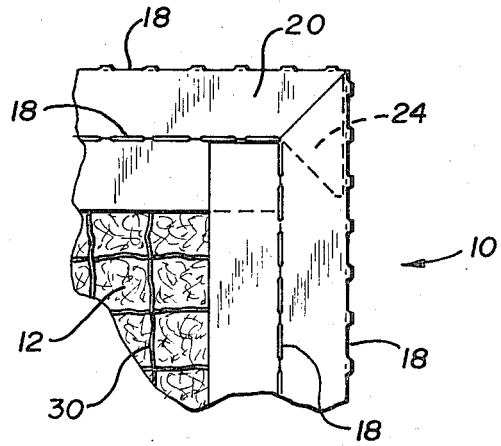
FIG. 4 is an enlarged cross-section of the partially disassembled air filter unit of FIG. 1 taken on line 4—4 thereof showing the interlocking intersections.

The corners of the frame, as best illustrated in FIG. 4 are rigidly secured by means of tabs 24 on alternate edges for example of top edge flange 20 being provided insertably secd8able to slots 26 in the opposite top edge flange, thereby allowing an interlocking tongue-and-groove at the intersection of the flange portions, to provide a highly resilient and strong corner to the frame. The tabs 24 and slots 26 may be secured by gluing, stapling and the like.

As more particularly shown in FIGS. 1 and 3 of the drawings, the filter 12 receives support, at the bottom center portion thereof, from the customary bottle cap scrap 28. The air filter unit of the present invention does not require the exotic, complex bottom and center support members required by other attempts to form compact stackable units. The top of the air filter unit of the invention, that is the air filter with its air inlet side facing the viewer as shown in FIG. 1, is placed with a scrim 30 formed of spaced apart resilient plastic strands to impart a finished appearance to the air filter unit and to prevent the pulling out or falling out of the filter 12 during handling, shipping and storage. The spaced apart strands of the scrim 30 may be formed of a heavy monofilament strand of common plastic material or twisted strands or bunches of any common plastic material, or even fibrous glass fibers coated with a plastisol binder, as is well known in the trade. The scrim may be of cotton, rayon, polyester, each individual bundle being bonded with starch binder, or glass fiber composition and the like. Both woven and non-woven scrims have been used with success. Meshes of 2 × 4 to 6 × 6 U.S. Standard or Tyler mesh are appropriate for this use.

In forming the air filter unit, the bottle cap scrap 28, the filter 12 and the bonded scrim 30 are brought together, and compressed between and adhesively or mechanically secured to, the top frame edge flange 20 and the bottom frame edge flange 22 using any common suitable adhesive means. The top edge flange 20 and the bottom edge flange 22 should extend well over the edges of the scrap 28, filter 12 and scrim 30, more particularly as shown in the attached drawings in FIG. 3 in order to insure integral strength and integrity in the air filter unit. This is particularly important when a very open, varying weave or density, random layering of very thin highly resilient glass fibers are used in forming the filter 12. It is further important that the assembly be securely adhered using an adhesive or mechanical fastening rather than an attempt made to rely upon a bonding by curing of uncured binder such as that binder used in forming the mat for the filter 12; as such is clearly insufficient to hold the strongly divergent and resilient materials of the assemblage.

For the adhesive used to secure the interlocking tabs 24 and slots 26, as well as the filter 12, scrim 30 and bottle cap scrap 28 between the top edge flange 20 and the bottom edge flange 22, may be used any of those well known slow-setting permanent adhesives, whether water based, or solvent based, or 100% solids, that will permanently bond similar or dissimilar surfaces by surface attachment exerting strong adhesive holding force without substantial cold creep or dimensional change with time and under load and which set to develop a long lasting, high, dry bond strength. These adhesives include casein, natural resin, natural rubber, synthetic rubber, polyvinyl acetate resin and synthetic resin adhesives and the like.

While the present invention has been described and exemplified with respect to certain embodiments, it is not to be considered limited thereto; and it is to be understood that variations and modifications thereof, obvious to those skilled in the art, may be made without departing from the spirit or scope of this invention.

What is claimed is:

1. An air filtering unit comprising:
  a. a rectangular paper board frame formed of a plurality of frame members having straight edges and connected together at the corners of said frame, each of said frame members comprising a top flange and a bottom flange folded over one another at a score line,
  b. an air-permeable filter of bonded glass fibers,
  c. a bottom covering of closely perforated metal sheet adjacent one surface of said filter,
  d. a scrim adjacent to the other surface of said filter,
  e. each of said top and bottom flanges having a portion coplanar with one face of said filter and the peripheral margins of said filter, said perforated metal sheet and said scrim being disposed intermediate said coplanar portions and being affixed thereto,
  f. each of said top and bottom flanges having a portion flaring outwardly from the coplanar portions of said flanges, and
  g. a tab portion provided on the flared portion of a flange of one frame member at each corner of said frame disposed intermediate and affixed to the flared portions of the top and bottom flanges of an adjacent frame member to provide tongue-andgroove interlocking intersections between adjacent frame members.

2. An air filtering unit according to claim 1 in which the scrim is composed of monofilament strands of glass fiber coated with a plastisol binder.

3. An air filtering unit according to claim 1 in which the scrim is composed of bundles of strands selected from the group consisting of cotton, rayon or polyester, each individual bundle being bonded with starch binder, and the bundles being on co-planar intersecting relationship to form a grid pattern.

4. An air filtering unit comprising:
   a. a rectangular paper board frame formed of a plurality of frame members having straight edges and connected together at the corners of said frame, each of said frame members comprising a top flange and a bottom flange folded over one another at a score line,
   b. an air-permeable filter of bonded glass fibers,
   c. a bottom covering of closely perforated sheet material adjacent one surface of said filter,
   d. each of said top and bottom flanges having a portion coplanar with one face of said filter, and the peripheral margins of said filter, and said perforated sheet being disposed intermediate said coplanar portions and being affixed thereto,
   e. each of said top and bottom flanges having a portion flaring outwardly from the coplanar portions of said flanges, and
   f. a tab portion provided on the flared portion of a flange of one frame member at each corner of said frame disposed intermediate and affixed to the flared portions of the top and bottom flanges of an adjacent frame member to provide tongue-and-groove interlocking intersections between adjacent frame members.

* * * * *

UNITED STATES PATENT OFFICE
CERTIFICATE OF CORRECTION

Patent No. 3,830,045                    Dated August 20, 1974

Inventor(s) John E. Copenhefer

It is certified that error appears in the above-identified patent and that said Letters Patent are hereby corrected as shown below:

Column 3, line 38, delete "secd8able" and insert -- securable --.

Signed and sealed this 19th day of November 1974.

(SEAL)
Attest:

McCOY M. GIBSON JR.          C. MARSHALL DANN
Attesting Officer            Commissioner of Patents